United States Patent [19]
Davis et al.

[11] 3,876,509
[45] Apr. 8, 1975

[54] AZEOTROPICALLY REMOVING HBR FROM BROMINATED PENTAERYTHRITOLS AND REACTING WITH AN EPOXY

[75] Inventors: Ralph A. Davis, Midland; Ronald G. Tigner, Coleman; Joseph J. Pedjac, Mt. Pleasant; Eric R. Larsen, Midland, all of Mich.

[73] Assignee: The Dow Chemical Company, Midland, Mich.

[22] Filed: Apr. 5, 1973

[21] Appl. No.: 348,361

Related U.S. Application Data

[63] Continuation-in-part of Ser. No. 169,139, Aug. 4, 1971, abandoned.

[52] U.S. Cl. .................. 203/38; 203/58; 260/633
[51] Int. Cl. ..... B01d 3/34; C07c 33/10; C07c 31/34
[58] Field of Search .................. 203/38, 53, 67, 58; 260/633

[56] References Cited
UNITED STATES PATENTS

| | | | |
|---|---|---|---|
| 3,303,107 | 2/1967 | Locke | 203/38 |
| 3,607,953 | 9/1971 | Hurley | 260/633 |
| 3,660,248 | 5/1972 | Tsao | 203/67 |

OTHER PUBLICATIONS

Sharts et al., J. Org. Chem., 30, 3310, 1965.
Beyaert et al., C.A. 37, 5373, 1943, Natiuired. Tijdschizz, 249–62, 1940.
Wawzonek et al., O.S. 38, 68–70, 1958.

*Primary Examiner*—Jack Sofer
*Attorney, Agent, or Firm*—Sidney J. Walker; Chessie E. Rehberg

[57] ABSTRACT

HBr is removed from reaction mixtures in the process of preparing brominated pentaerythritols by azeotropic distillation with water and perchloroethylene and utilizing oxiranes and oxetanes as HBr scavengers.

3 Claims, No Drawings

AZEOTROPICALLY REMOVING HBR FROM BROMINATED PENTAERYTHRITOLS AND REACTING WITH AN EPOXY

CROSS-REFERENCE TO OTHER APPLICATION

This is a continuation-in-part of our pending U.S. Pat. application Ser. No. 169,139, filed Aug. 4, 1971, now abandoned.

BACKGROUND OF THE INVENTION

Large numbers of azeotropes are known; for example, the azeotrope of water and perchloroethylene and the azeotrope of water and HBr are known. The ternary azeotropic mixture of water, HBr and perchloroethylene, however, is not known. Moreover, the traditional method of removing HBr from a reaction mixture is neutralization with a base and removal of the salt formed by washing. Products containing undesirably large quantities of inorganic salts are obtained by this technique.

Removal of minor amounts of HCl from halogenated organic compounds utilizing epoxy compounds as scavengers is also known. Thus, in U.S. Pat. No. 3,303,107 it is disclosed that epoxy compounds containing at least one oxirane group such as styrene oxide, ethylene oxide, epichlorohydrin, and the like, may be used as an HCl scavenger to purify vinyl chloride using a distillation step to then remove the epoxy compound.

In the preparation of brominated pentaerythritols, wherein HBr and pentaerythritol are reacted in a hydrocarbon or halogenated organic solvent, using an acid catalyst produces a brominated pentaerythritol product useful as a fire retardant in polyesters, polyurethane foam and the like. However, any trace amounts of HBr left in the product will cause undesirable color in the final polymer product and undue corrosion in the "cooking" of the polymer product when the fire retardant is incorporated, for example, in a polyester resin.

SUMMARY OF THE INVENTION

It has now been found in the present invention that in the manufacture of brominated pentaerythritols formed by reacting pentaerythritol with HBr, the excess HBr can be removed from the reaction mixture by azeotropic distillation with water and perchloroethylene and thereafter the trace of HBr remaining in the brominated pentaerythritol can be neutralized with an epoxy compound having an oxirane or oxetane group. The novel use of either class of compounds in the present invention effectively removes the color and acid from the product. By "epoxy compound having an oxirane group" is meant a compound containing at least one 1,2-epoxy or oxirane group. Suitable oxides for use in the instant invention include, for example, ethylene oxide, propylene oxide and other alkylene oxides; 1,2-epoxy butane and the like; epichlorohydrin, epibromohydrin, 1,2-epoxy-5-bromohexane, and the like; and other compounds containing the oxirane group such as triphenyl ethylene epoxide, epoxidized soybean oil and the like. Preferred epoxides include epichlorohydrin, epibromohydrin, styrene oxide and alkylene oxides.

When the above epoxides are used to scavenge the residual HBr in the reaction product in the practice of the present process, a neutralization reaction takes place whereby the epoxide and the HBr react to form a brominated product. Thus, where epichlorohydrin is used to scavenge the HBr, the HBr opens the oxirane ring to form the 1,3-halogenated propanol-2. This product and similar products formed when other epoxides are used as HBr scavengers in the instant process need not be removed from the final brominated pentaerythritol product in most applications of that product. Brominated pentaerythritols have their greatest utility as fire retardant intermediates and may be used directly for such purposes and also as reaction components in polymer systems. In some of these latter systems, as will be delineated below, the use of these epoxides as HBr scavengers is less desirable because the reaction product of the expoxide and the HBr is volatile and likely to dehydrohalogenate when the fire retardant brominated pentaerythritols are cooked into polyesters and may also cause foam scorching in polyurethane foams. In such applications, it is more desirable to use as the HBr scavenger the oxetanes of the present invention.

"Epoxy compounds having an oxethane group," as used herein, are defined to mean trimethylene oxide, and any oxetane having 3,3-bis(haloalkyl) substitution or 3,3-bis(alkyl) substitution, wherein the halo is chlorine or bromine and the alkyl moiety contains from 1 to 4 carbons. Said substituted oxetanes include 3,3-bis(bromomethyl)-oxetane, 3,3-bis(chloromethyl)oxetane, 3-methyl-3-ethyl oxetane, 3-chloromethyl-3-bromomethyl oxetane, 3,3-bis(propyl)oxetane and the like. When such oxetanes react with HBr, a haloneopentyl alcohol is formed which is stable and high boiling. Consequently, as will be seen below, discloration, corrosion and foam scorching is eliminated when the brominated pentaerythritol product is used as a fire retardant in polymers. Preferred among these oxetanes are the halo-substituted ones as they add fire retardancy due to the presence of the additional halo group or groups. Especially preferred is 3,3-bis(bromomethyl)oxetane (BBMO) because its forms tribromoneopentyl alcohol when it reacts with HBr which, of course, is one of the desired end products of the overall process. This reaction is shown by the following equation:

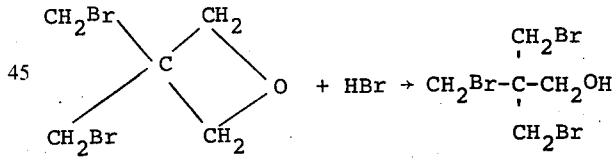

In this method, the reaction mixture containing HBr, water and perchloroethylene is distilled in such a manner that the HBr, water and perchloroethylene form an azeotropic mixture which is found in the distillate.

The azeotropic mixture of the invention consists of three components, HBr, water and perchloroethylene in the proportions of approximately 34:27:39 parts by weight, respectively. The azeotropic mixture has a boiling point of 63°–67°C. at 175 mm. of Hg. The distillate received forms two layers - one of which is essentially concentrated hydrobromic acid and the other of which is perchloroethylene. This separation facilitates recycle of the perchloroethylene, if desired.

It is to be understood that the distillation can take place under a wide range of pressures - under vacuum up to above atmospheric. Depending on the economics of heat costs versus sophisticated vacuum equipment, the pressure can range from 3 mm. to 15 p.s.i.g. The preferred range is from 25 mm. to atmospheric while especially preferred in this system is a range of from about 50 mm. to about 300 mm. Hg.

The azeotropic removal of HBr in the described process is conveniently carried out to remove practically all of the HBr in the reaction mixture. The removal of all the HBr by this technique, however, is virtually impossible for there is a very small residual quantity of HBr that is most difficult to remove by these techniques. Thus, the second step of the invention is utilized for complete removal of the HBr. After the stripping operation by the azeotropic distillation, the epoxide or oxetane is introduced into the reaction product in small amounts sufficient to neutralize the free HBr remaining.

A special advantage of this invention is that the bulk of the excess HBr in the reaction that is azeotropically distilled can be conveniently recycled to the reaction as aqueous HBr. The minute, but harmful, amount of HBr remaining in the reaction product is then converted, thus avoiding the processing problems referred to above.

Pentaerythritol, as used herein, is defined to include pentaerythritol that has been partially halogensubstituted. Thus, the process of the invention is applicable to the preparation of brominated pentaerythritols where one to three of the hydroxyls have been replaced by bromine.

SPECIFIC EMBODIMENTS

Example 1

Removal of HBr After the Bromination of Pentaerythritol with HBr

A three-liter reactor equipped with a condenser and pressure regulator was charged with 350 ml. of perchloroethylene, 54 g. (0.9 mole) of acetic acid and 544 g. (4.0 moles) of pentaerythritol. Over a period of two hours and 40 minutes at a temperature of 110° to 118°C. and a pressure of 5 p.s.i.g., 842 g. (10.4 moles) of HBr was added. After the addition, the reactor was maintained at 113°C. for an additional 30 minutes. An azeotropic recycle head was placed on the reactor and the HBr, water and perchloroethylene was distilled from the reaction mixture. The distillation was conducted at 175 mm. of Hg until the last 15 minutes, when the final vacuum was brought down to 50 mm. The pot temperature ranged from 67° to 102°C. while a head temperature ranged from 63° to 67°C. The distillation was conducted over a time of 3 hours and 10 minutes. One hour and 55 minutes from the beginning of the distillation, the aqueous layer containing water and HBr was isolated. The aqueous layer had a volume of 158 ml., a density of 1.456 and was analyzed to contain 45.4 percent by weight HBr. At the end of the distillation, the remaining aqueous layer was isolated. This cut was found to have a volume of 57 ml., a density of 1.634 and contained 59.2 weight percent of HBr. The product recovered weighed 1091 g. and had the following analysis by weight percent as determined from gas-liquid chromatography: 10.8 percent monobromopentaerythritol, 74.1 percent dibromoneopentyl glycol, 9.74 percent tribromoneopentyl alcohol and 0.96 percent HBr. The product as a melt had a light orange color and as a solid was cream colored.

Example 2

Removal of HBr by Azeotropic Distillation and Treatment with an Epoxide

In the same manner as shown in Example 1, the reactor was charged with 350 ml. of perchloroethylene, 10 g. of acetic acid and 544 g. (4.0 moles) of pentaerythritol. To this mixture was added 907 g. (11.2 moles) of HBr over a period of 5 hours and 20 minutes at a temperature of 104° to 119°C. and a pressure of 5 p.s.i.g. The reaction was heated for an additional 30 minutes at 114°C. The HBr, water and perchloroethylene were removed by azeotropic distillation at 86° to 100°C. and 50 mm. of Hg. To a melt of the orange colored product maintained at 90°C., 25 ml. of epichlorohydrin was added with stirring and the product became a light amber color. Upon solidification, the liquid was decanted and a white solid weighing 1046 g. was obtained having an analysis by weight percent of: 14.0 percent monobromopentaerythritol, 74.1 percent dibromoneopentyl glycol, 5.3 percent tribromoneopentyl alcohol and 0.42 percent $H_2O$. No HBr was detected in the product. Thus, treatment with the epichlorohydrin not only eliminates the HBr but also substantially improves the color of the final product.

To compare the efficacy of the oxetanes and epoxides as scavengers, similar brominated pentaerythritol products prepared by the process of Example 1, above, containing trace amounts of HBr, were analyzed for acidity and color as shown in Examples 3-7 below.

Examples 3-7

Removal of Trace HBr by Treatment with Epoxides and BBMO

Five test tubes were prepared on the brominated pentaerythritol products from which the bulk of the HBr, water and perchloroethylene had been azeotropically distilled as in Example 1, above, by melting 20 grams in each test tube at 90°C. and maintaining this temperature while the free acid was neutralized utilizing 0.2 cc. of the various epoxides and BBMO. One scavenger was added to each of these test tubes with stirring and where the color did not disappear, an additional 0.1 cc. was added to insure neutralization of the free HBr present. Acidities were determined by titrating to give a phenolphthalein end point with N/10 NaOH and calculated as HBr. Light transmittance data were obtained on a B. and L. Spectronic 20 and a Gardner color calculated from these data. The data from these determinations are given in Table I, below.

| Example | Additive | Acidity as % HBr Before Neutralization | Acidity as % HBr After Neutralization | % Transmittance Wave Length Mµ | % Transmittance Before treatment | % Transmittance After treatment | Gardner Melt Index Color No. Before | Gardner Melt Index Color No. After |
|---|---|---|---|---|---|---|---|---|
| 3 | Epichlorohydrin | 0.03% | Nil | 450 | 29 | 45 | | |
| | | | | 550 | 60 | 73 | | |
| | | | | 625 | 75.5 | 80 | 7.7 | 5.4 |
| 4 | Propylene oxide | " | " | 450 | 29 | 47 | | |
| | | | | 550 | 60 | 78 | | |
| | | | | 625 | 75.5 | 88 | " | " |

—Continued

| Example | Additive | Acidity as % HBr | | % Transmittance | | | Gardner Melt Index Color No. | |
|---------|----------|------------------|---|-----------------|---|---|------------------------------|---|
| | | Before Neutralization | After Neutralization | Wave Length Mµ | Before treatment | After treatment | Before | After |
| 5 | Styrene oxide | " | " | 450 | 29 | 50 | | |
| | | | | 550 | 60 | 78 | | |
| | | | | 625 | 75.5 | 88 | " | 5.3 |
| 6 | Epichlorohydrin | 0.02% | " | 450 | 50 | 70 | | |
| | | | | 550 | 75 | 89 | | |
| | | | | 625 | 82 | 96 | 5.0 | 3.9 |
| 7 | BBMO | 0.05% | 0.00 | 450 | 29 | 44 | | |
| | | | | 550 | 58 | 68 | | |
| | | | | 625 | 70 | 80 | 6.9 | 4.8 |

As shown above, oxiranes and oxetanes are equally effective in removing the residual HBr from the reaction product. However, in some end uses of the reaction products the oxetanes are preferred; for example, where the brominated pentaerythritol is to be used as a reactive fire retardant in slab stock polyurethane foam. Slab stock polyurethane foam is made in large buns which evolve considerable heat in their formation. In such uses, the oxetane is preferred as the reaction product of the oxetane in the HBr is stable and high boiling. By contrast the Oxirane-HBr reaction product is less stable, more volatile and dehydrohalogenates more readily. However, it is to be understood that the oxirane neutralized brominated pentaerythritol may be used where smaller polyurethane foam parts are molded. In such cases, the temperatures are less and the scorching effect of the oxirane-HBr reaction product does not occur.

Similarly, both the oxirane and oxetane neutralized brominated pentaerythritol may be used as fire retardants for polyesters. However, when the polyester is cooked in a stainless steel reactor it is found that the oxirane-HBr reaction product will corrode the reactor more readily. In such cases the oxetane is the preferred neutralizer. Where glass systems are used to cook the polyesters, use of the oxirane is not a problem.

The above advantages of the oxetane in particular circumstances are shown in the series of examples, below.

Examples 8-15

Comparison of Oxirane and Oxetane Neutralized Tribromoneopentyl Alcohol in Polyurethane Foam A brominated pentaerythritol was prepared and the bulk of the HBr was removed along with the water and the perchloroethylene utilizing the first step of the process of this invention, i.e., ternary azeotropic distillation. This product contained about 97.8 percent tribromoneopentyl alcohol and about 2.2 percent dibromoneopentyl glycol. Its acidity was in the range of 0.02 to 0.05 percent. This material was divided into four equal samples. Sample A was not neutralized, Sample B was neutralized with epichlorohydrin (20 meq./kg.), Sample C was neutralized with 3,3-bis(chloromethyl)oxetane (20 meq./kg.), and Sample D was neutralized with BBMO (20 meq./kg.). Each sample was then separately dissolved in a polyol at a level of about 10 percent and then blended in the conventional manner with catalysts, blowing agents and surfactants. The four samples were then mixed with an isocyanate and foams A, B, C and D were prepared corresponding to the above samples and cured at 150°C. for 45 minutes.

After cure, visual inspection showed Sample A to be definitely yellow in color while Samples B, C and D were near white.

The bottom one inch of each foam bun was removed and 1½ inch thick semi-circular slices from each bun were wrapped in aluminum foil and placed in a 150°C. circulating air oven for 16 hours as a heat aging test. Visual inspection showed that Sample C was slightly lighter colored than Sample D which in turn was much lighter and less colored than Samples B and A. Sample B which was the foam prepared utilizing the brominated pentaerythritol neutralized with epichlorohydrin gave a foam which was almost as badly discolored as the nonneutralized Sample A.

A second series of three foams (Samples E, F and G) were prepared as in the above formulation using the same concentration of the same brominated pentaerythritol product. Sample E was neutralized with epichlorohydrin, Sample F was neutralized with BBMO and Sample G had all of the HBr removed through distillation and recrystallization of the alcohol. The three samples were again heat age tested as above and the order of discoloration of the foams after 16 hours at 150°C. was as follows:

E > F > G

Examples 15-21

Comparison of Corrosive Effects of an Oxirane System with an Oxetane System

A series of polyester cooks were carried out in a stainless steel reactor in order to compare the effect of the neutralizing agent upon the corrosion of the reactor. The relative amounts of corrosion were determined by analyzing the polyester alkyd for iron - the higher the iron content of the resin, the higher the corrosion rate. Seven runs were made under identical conditions, quantities and materials except that, as indicated in Table II, below, batches A and C of the brominated pentaerythritols had an initial iron content of 2 p.p.m. while batch B of the brominated pentaerythritols had an initial iron content of 5 p.p.m. Further, batches A and B had their residual HBr removed by reaction with epichlorohydrin (ECH) while batch C utilized BBMO. The brominated pentaerythritol product comprised approximately 82 percent dibromoneopentyl glycol, 7 percent monobromoneopentyl triol and 11 percent tribromoneopentyl alcohol.

In each of the seven runs, the reactor was charged with 281 g. (1.9 m) of o-phthalic anhydride and 186 g. (1.9 m.) of maleic anhydride. The mixed anhydrides were melted and brought to about 115°C. under a nitrogen blanket. In each run, equal amounts (1,048 g.)

TABLE II

| Example | Brominated Pentaerythritol | Neutralizing Agent | Iron Content (p.p.m.) (Final Resin Product) | Acid No. | Comment |
| --- | --- | --- | --- | --- | --- |
| 15 | A | ECH | 23 | 32.5 | Clean reactor |
| 16 | B | ECH | 35 | 27.5 | |
| 17 | C | BBMO | 21 | 26.5 | |
| 18 | B | ECH | 38 | 29.0 | |
| 19 | A | ECH | 42 | 33.4 | |
| 20 | C | BBMO | 28 | 26.2 | |
| 21 | C | BBMO | 17 | 17.4 | Clean reactor |

Fe content of brominated pentaerythritol starting material: A = 2 p.p.m.; B = 5 p.p.m.; C = 2 p.p.m.

of solid brominated pentaerythritol product was added to the reactor in two portions, two-thirds of the material being added in one portion and 15 minutes later the last one-third was added. The reaction temperature was raised to 185°C. during the space of about ½ hour and maintained at this temperature until the acid number indicated in Table II was reached. This took about 5½ hours. The nitrogen flow through the reaction was held at about 450 cc./min. throughout the cooking cycle. Approximately 55 ml. of water was collected in the Dean-Stark tube.

The alkyd was cooled to about 150°C. and 0.76 g. of hydroquinone inhibitor added. After mixing, the mixture was poured into a Teflon-lined tray to cool. The samples of the alkyd were then analyzed for iron.

Runs 15 and 21 are comparable in that both were carried out in a clean reactor. In this connection it should be noted that the brominated pentaerythritol product neutralized with the oxetane (BBMO) showed less corrosion in spite of the fact that it was cooked to a much lower acid number than was the brominated pentaerythritol neutralized with epichlorohydrin. Runs 16 through 20 are comparable in that they were run sequentially without cleaning the reactor between runs. Run 16 was run in the reactor after Run 15 without cleaning the reactor, etc.; however, the residual polymer remaining in the reactor was small - less than 2 percent of the charge in each case. Nevertheless, some iron carry-over occurred. The mean iron content of these resins cooked using epichlorohydrin was about 38 p.p.m. while those using the oxetane was about 25 p.p.m. Correlating these results and acid numbers, Table II shows that the corrosion rate when epichlorohydrin was used was about 150 percent of the corrosion rate that occurred when the brominated pentaerythritols were neutralized using BBMO. Comparable results would be expected with any oxetane having a 3,3-bis(haloalkyl) or a 3,3-bis(alkyl) substitution.

In the same manner as shown for epichlorohydrin, other epoxides, such as ethylene oxide, styrene oxide, propylene oxide and butylene oxide are added to the reaction mixture after the azeotropic distillation to remove the last traces of the HBr from the reaction mixtures. Also, in the same manner as shown for 3,3-bis(bromomethyl)-oxetane and 3,3-bis(chloromethyl)oxetane, other oxetanes, such as trimethylene oxide, 3-methyl-3-ethyl oxetane, 3-chloromethyl-3-bromomethyl oxetane, and the like are added to the reaction mixture after the azeotropic distillation to remove the last traces of the HBr from the reaction mixtures. These oxetane-neutralized reaction products are effectively used in the manufacture of polyurethane foams without causing scorching and in the manufacture of alkyd resins in stainless steel reactors without causing undue corrosion.

We claim:

1. A method for removing HBr from a reaction mixture formed by the reaction of pentaerythritol and HBr in a perchloroethylene solvent, said reaction mixture including brominated pentaerythritols, HBR, water and perchloroethylene, said method comprising (a) separated as distillate the bulk of the HBr, the water and the perchloroethylene from the brominated pentaerythritols by azeotropic distillation and (b) reacting the residual HBr remaining with the brominated pentaerythritols with an epoxy compound having an oxirane or oxethane group, thereby producing brominated pentaerythritols free of HBr.

2. The method of claim 1 wherein the epoxy compound is trimethylene oxide, 3,3-bis(bromomethyl)oxetane or 3,3-bis(chloromethyl)oxetane.

3. The method of claim 1 wherein the epoxy compound is epichlorohydrin, epibromohydrin, styrene oxide or an alkylene oxide.

* * * * *